Dec. 25, 1962 SATOSHI SHIMADA 3,070,657
HORIZONTAL DEFLECTION SYNCHRONIZING DEVICE
Filed Aug. 24, 1960
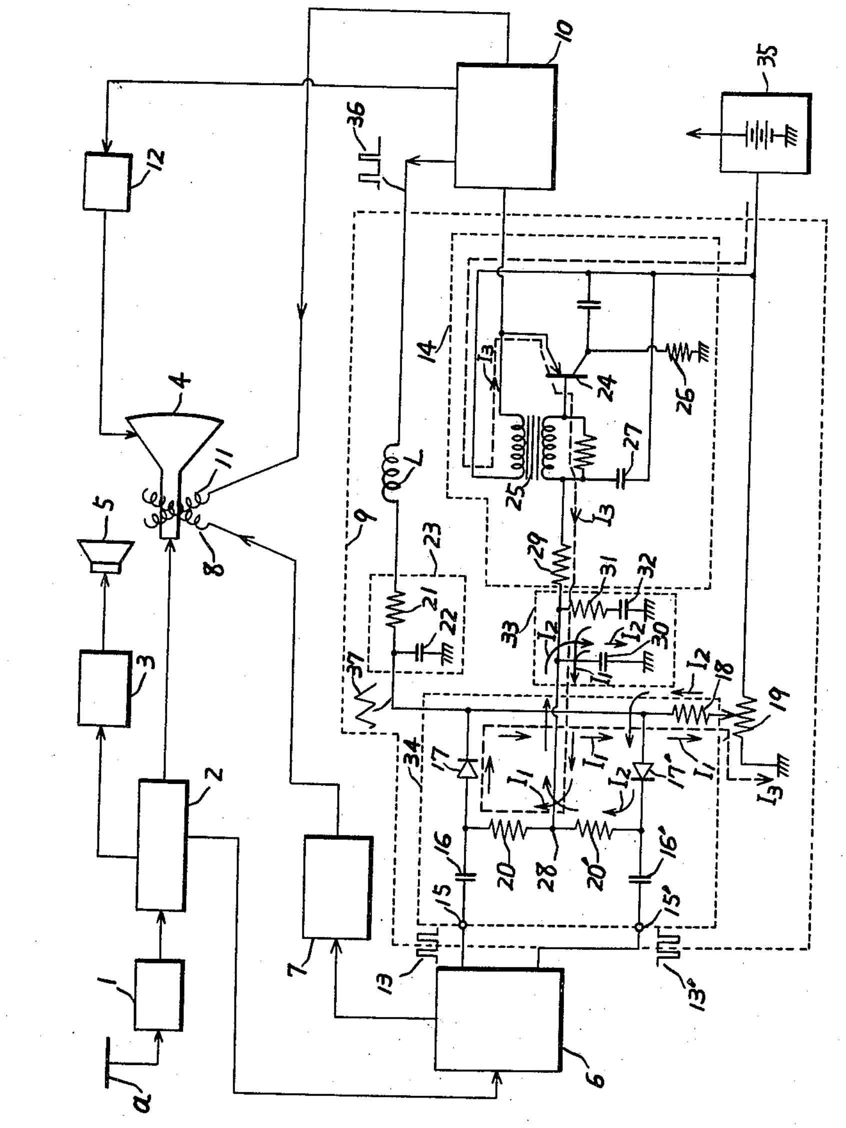
Inventor
Satoshi Shimada
by Hill, Sherman, Meroni, Gross & Simpson Attys.

3,070,657

HORIZONTAL DEFLECTION SYNCHRONIZING DEVICE

Satoshi Shimada, Ota-ku, Tokyo, Japan, assignor to Sony Corporation, Shinagawa-ku, Tokyo, Japan, a corporation of Japan Filed Aug. 24, 1960, Ser. No. 51,665
Claims priority, application Japan Aug. 24, 1959
3 Claims. (Cl. 178—69.5)

This invention relates to a horizontal deflection synchronizing device in a television receiving apparatus, and more particularly to such a device for achieving improved automatic frequency control of a horizontal deflecting device of a television receiving apparatus.

One object of this invention is to provide a simple, accurate and reliable horizontal deflection synchronizing device using a transistor in a television receiving apparatus.

Another object of this invention is to provide a horizontal deflection synchronizing device in which automatic frequency or phase control effect is improved without generating noise.

Further objects, features and advantages of this invention will be more apparent from the description of the accompanying drawing, the single FIGURE of which shows a circuit diagram, by way of example, of a television receiving apparatus employing a horizontal deflection synchronizing device according to this invention.

Referring to the drawing, I will explain a synchronizing device using transistors, by way of example, in a television receiving apparatus according to this invention. The letter "*a*" designates an antenna, 1 designates a tuner, 2 is a video signal receiving system including an intermediate frequency amplifier, a second detector, video signal amplifier and the like. 3 represents an audio signal receiving system including an audio intermediate frequency amplifier, a second detector, audio frequency amplifier and the like. Numeral 4 designates a cathode ray tube, and 5 a speaker. 6 a synchronizing signal separating circuit.

7 is a vertical deflection oscillator and amplifier. 8 a vertical deflecting coil. 9 is a horizontal deflection synchronizing device according to this invention which will be hereinafter explained. 10 shows a horizontal deflecting amplifier.

11 a horizontal deflecting coil. 12 a high potential (direct-current) producing circuit. 35 is an electrical source.

The above parts are connected to one another in the ordinary manner as seen in the block diagram of the drawing and a more detailed explanation will be omitted for the sake of simplicity since those skilled in the art will understand the outline of the system.

In accordance with this invention two kinds of horizontal synchronizing signals 13 and 13′ having respectively positive and negative polarities are led out from the synchronizing signal separating circuit 6. The phase difference between an incoming horizontal synchronizing signal and a horizontal deflection current is detected as an electrical power output. For this purpose, two kinds of horizontal synchronizing signals and the output of a horizontal deflection signal oscillator 14 which will be hereinafter described or one part of the output from the horizontal deflection output amplifier 10 are compared. The detected power output controls directly the frequency of the oscillator 14 which may consist of a transistor blocking oscillator.

For this purpose, to the terminals 15 and 15′ to which the positive and negative synchronizing signals are respectively led from the synchronizing signal separating circuit 6 are respectively connected one pair of electrodes of diodes 17 and 17′ with inverse polarities through respectively capacitors 16 and 16′, and the other electrodes of the diodes are commonly connected to the electrical source 35 through a resistor 18 and a variable resistor 19, the other end of the variable resistor 19 being grounded.

Across the input terminals of the diodes 17 and 17′ are connected in series resistors 20 and 20′ having respectively comparatively low resistance such for example as several hundred ohms. The connection point 28 forms one terminal with respect to the other ground terminal. Thus, a balanced type phase detecting circuit 34 is formed, which circuit has two diodes connected in push-pull type to be differentially operated and which is connected in the output circuit of said synchronizing signal separating circuit 6.

A phase comparison signal 37 is applied to the diodes 17 and 17′ to which the resistor 18 is connected, through a comparison signal integrating circuit 23 consisting of a resistor 21 and a capacitor 22, from the horizontal deflection output amplifier 10 or a horizontal deflection oscillator 14 (the horizontal deflection output amplifier 10 is used in the example shown in the drawing).

A transistor blocking oscillation circuit will be used as the horizontal deflection oscillator 14 but other types of oscillator circuits may also be employed.

In the oscillator shown in the drawing, 24 is an oscillation transistor; 25 is a coupling transformer; 26 a voltage drop resistor and 27 a oscillation capacitor.

The connection point 28 of the resistors 20 and 20′ is connected, through or without a resistor 29 having low resistance of substantially below several ten times the forward resistance of the diode 17 or 17′, such for example as several hundred ohms, to the base of the oscillation transistor 24. Between the connection point 28 and ground are connected a capacitor 30 having capacity such for example as 0.1 μf. and a series circuit of a resistor 31 having comparatively low resistance such for example as several hundred ohms and a capacitor 32 having large capacitance such for example as 5 μf., as compared with that of the capacitor 30 in order to form a control signal integrating circuit 33.

It is particularly noted that the direct current output resistance appearing at the input terminal or the base of the transistor 24 is selected as a low value, such for example as several kilo-ohms or less than the value.

According to the above device, one part of the output pulse 36 from the horizontal deflection amplifier 10 is converted to a comparison signal 37 for example, a saw tooth wave form or an analogous wave form by the comparison signal integrating circuit 23 and impressed to a pair of terminals of the diodes 17 and 17′.

At the same time the horizontal synchronizing pulse signals 13 and 13′ which have opposite polarities are applied to the other terminals of the diodes.

Accordingly the currents $I_1$ and $I_2$ as shown by the full line arrows are passing through the respective diodes 17 and 17′. The power difference at the connection point 28 of the resistors 20 and 20′ is zero so long as the comparison signal 37 is the same phase with the horizontal synchronizing pulse signals 13 and 13′.

In the case, however, where there occurs a phase difference between the comparison signal 37 and the horizontal synchronizing pulse signals 13 and 13′ there appears a phase detecting output at the connection point 28 according to the phase difference of the two signals 37 and 13 or 13′.

This current is led to the control signal integrating circuit 33 which integrates the current due to the phase difference between the synchronizing signals 13 or 13′ and the comparison signal 37. Thus a controlling current $I_3$ shown by the dotted line is passing through the transistor 24 of the blocking oscillator circuit 14. Accordingly the controlling current results in a change in the frequency or phase of the oscillation current produced by the blocking oscillation circuit 14, which results in the automatic frequency and phase control effect.

In this case the following relationships are satisfied in connection with the mean value of the current $I_1$, $I_2$ and $I_3$:

$$|\bar{I}_3|=|\bar{I}_1|\sim|\bar{I}_2|, \quad |\bar{I}_3|<|\bar{I}_1|$$
$$|\bar{I}_3|<|\bar{I}_2|, \quad |\bar{I}_3|>0$$

It is again noted that the controlling current $I_3$ is passing through the transistor 24 of the blocking oscillator circuit 14 to control the oscillation frequency or the phase.

The direct current resistance seen from the transistor 24 is so small that the power control sensitivity to the transistor 24 is great without generating noise such as hum, thereby improving the automatic frequency and phase control effect. As seen from the description the phase controlling signal from the phase detecting circuit 34 is directly applied to the oscillator circuit 14 without any amplifier to control the same thereby stabilizing the device with simple connections. Moreover, an inductance coil L can be inserted in a feed-back circuit for feeding back the deflection output from the horizontal deflection signal oscillator 14 or its output amplifier 10 to the phase detecting circuit 34. In this example such a coil L is inserted in the circuit directly before the integrating circuit.

Thus, the inductance coil L acts to slightly delay the output pulse 36 which is to be converted to the comparison signal 37 so that the phase difference between the horizontal output current and the video signal, can be avoided, thereby eliminating a folded picture.

It will be apparent that many modifications and variations may be effected without departing from the scope of the novel concepts of this invention.

What is claimed is:

1. In a television apparatus, a deflection oscillator control system comprising a phase detector circuit including a pair of diodes arranged to conduct on signals of opposite polarity, means for introducing signals at one polarity to one of said diodes and signals of opposed polarity to the other of said diodes,
   a deflection amplifier,
   means providing a control signal from said deflection amplifier,
   an integrating circuit receiving said control signal and having its output connected to both said diodes,
   a variable frequency oscillator,
   and circuit means for transmitting a current output from said diodes responsive to phase differences in said control signal into said variable frequency oscillator.

2. The system of claim 1 which also includes an inductance in combination with said integrating circuit for delaying the control signal from said deflection amplifier.

3. The system of claim 1 which includes a second integrating circuit between the output of said diodes and said variable frequency oscillator.

References Cited in the file of this patent

UNITED STATES PATENTS

| | | |
|---|---|---|
| 2,358,545 | Wendt | Sept. 19, 1944 |
| 2,463,685 | Fredendall | Mar. 8, 1949 |
| 2,551,785 | Bedford | May 8, 1951 |
| 2,708,689 | Vonderschmitt | May 17, 1955 |

OTHER REFERENCES

Transistors in Radio and Television, Kiver, McGraw-Hill Book Company, Inc., copyright 1956. (Copy in Patent Office Scientific Library.) (FIG. 13, page 196 and pages 201, 202 relied on.)